United States Patent
McFadden et al.

(10) Patent No.: US 12,420,719 B2
(45) Date of Patent: Sep. 23, 2025

(54) VERTICAL BICYCLE RACK

(71) Applicant: Yakima Products, Inc., Lake Oswego, OR (US)

(72) Inventors: Scott A. McFadden, Portland, OR (US); Kirk William Turner, Moscow, ID (US); Joseph P. Burkley, Portland, OR (US); Brandon Michael Willems, Portland, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 587 days.

(21) Appl. No.: 17/866,184

(22) Filed: Jul. 15, 2022

(65) Prior Publication Data

US 2023/0020722 A1    Jan. 19, 2023

Related U.S. Application Data

(60) Provisional application No. 63/222,352, filed on Jul. 15, 2021.

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .... B60R 9/06; B60R 9/08; B60R 9/10; B60R 9/048
See application file for complete search history.

(56) References Cited

U.S. PATENT DOCUMENTS

| | | |
|---|---|---|
| 3,921,869 A | 11/1975 | Rogers |
| 4,171,077 A | 10/1979 | Richard, Jr. |
| 5,067,641 A | 11/1991 | Johnson et al. |
| 5,082,120 A | 1/1992 | Vega |
| 5,211,323 A | 5/1993 | Chimenti et al. |
| 5,526,971 A | 6/1996 | Despain |
| 5,558,261 A | 9/1996 | Hedeen |
| 5,579,972 A * | 12/1996 | Despain .................. B60R 9/06 224/521 |
| 5,647,521 A | 7/1997 | Burgess |
| 5,803,330 A | 9/1998 | Stack et al. |
| 5,871,131 A | 2/1999 | Low et al. |
| 5,996,870 A | 12/1999 | Shaver |
| 6,010,049 A | 1/2000 | Stein |
| 6,123,498 A | 9/2000 | Surkin |
| 6,435,523 B1 | 8/2002 | Hilk |

(Continued)

FOREIGN PATENT DOCUMENTS

| | | |
|---|---|---|
| AU | 2017101782 A4 | 3/2018 |
| CA | 2107860 A1 | 5/1994 |

(Continued)

*Primary Examiner* — Brian D Nash
(74) *Attorney, Agent, or Firm* — Kolisch Hartwell, P.C.

(57) ABSTRACT

A vertical bicycle rack is disclosed, including a horizontal beam and a plurality of support stations mounted to the horizontal beam. Each station is configured to support a bicycle in a vertical position and including a pair of cradles. Each cradle is configured to receive a handlebar of the supported bicycle and includes a strap to secure the received handlebar. A lower one of the pair of cradles includes a bumper to contact a frame component of the supported bicycle.

19 Claims, 10 Drawing Sheets

(56) References Cited

U.S. PATENT DOCUMENTS

| | | |
|---|---|---|
| 6,460,745 B1 | 10/2002 | Weaver |
| 6,491,195 B1 | 12/2002 | McLemore et al. |
| 6,516,986 B1 | 2/2003 | Lassanske et al. |
| 6,523,731 B1 | 2/2003 | Pedrini |
| 6,834,786 B2 | 12/2004 | Hansen |
| 7,900,802 B2 | 3/2011 | Hammond |
| 7,959,047 B2 | 6/2011 | Hammond |
| D663,676 S | 7/2012 | Loken et al. |
| 8,434,655 B2 | 5/2013 | Hammond |
| 9,321,406 B2 | 4/2016 | Loken |
| 9,321,407 B2 | 4/2016 | Loken |
| 9,371,042 B1 | 6/2016 | Dratewski |
| 9,862,439 B2 | 1/2018 | Hammond |
| 10,183,627 B1 | 1/2019 | Liu |
| 10,501,023 B1* | 12/2019 | Mayers ............... B60R 9/10 |
| 10,850,678 B2 | 12/2020 | McFadden et al. |
| 10,906,473 B1 | 2/2021 | Yu |
| 11,046,379 B2 | 6/2021 | Tsai |
| 11,142,133 B1* | 10/2021 | Oshman ............... B60R 9/10 |
| 11,148,607 B1 | 10/2021 | Hsieh et al. |
| 11,351,929 B2 | 6/2022 | McFadden et al. |
| 11,518,317 B2* | 12/2022 | Oshman ............... B60R 9/06 |
| 2001/0035446 A1 | 11/2001 | Walstrom et al. |
| 2005/0082329 A1* | 4/2005 | Cohen ................ B60R 9/10 |
| | | 224/924 |
| 2006/0237505 A1 | 10/2006 | Hammond |
| 2007/0119889 A1 | 5/2007 | Hammond |
| 2011/0101060 A1 | 5/2011 | Hammond |
| 2013/0327802 A1 | 12/2013 | Hammond |
| 2014/0027484 A1 | 1/2014 | Loken |
| 2014/0151421 A1 | 6/2014 | Loken |
| 2017/0253188 A1 | 9/2017 | Shen |
| 2018/0072237 A1 | 3/2018 | Kuschmeader et al. |
| 2018/0251076 A1 | 9/2018 | Casagrande |
| 2018/0354427 A1* | 12/2018 | Yazdian ............... B60R 9/10 |
| 2019/0016271 A1* | 1/2019 | Garceau .............. B60R 9/06 |
| 2019/0161022 A1 | 5/2019 | McFadden et al. |
| 2021/0107580 A1* | 4/2021 | Flynn ................. B62H 3/12 |
| 2021/0253034 A1 | 8/2021 | McFadden et al. |
| 2022/0281390 A1* | 9/2022 | Oshman ............. B60R 3/005 |
| 2023/0042341 A1* | 2/2023 | Zapiach .............. B60R 9/10 |
| 2023/0365068 A1* | 11/2023 | Taylor ................ B60R 9/06 |

FOREIGN PATENT DOCUMENTS

| | | |
|---|---|---|
| CA | 2468447 A1 | 8/2005 |
| CA | 2468447 C | 11/2006 |
| DE | 2809268 A1 | 9/1978 |
| DE | 3890700 C2 | 12/1996 |
| DE | 10107897 A1 | 9/2002 |
| EP | 0095548 A2 | 12/1983 |
| EP | 0721860 A1 | 7/1996 |
| EP | 1150863 B1 | 3/2003 |
| GB | 2327655 A | 2/1999 |
| GB | 0015085 | 8/2000 |
| GB | 2512033 A | 9/2014 |
| JP | 2005178722 A | 7/2005 |
| JP | 2015058737 A | 3/2015 |
| WO | 8901883 A1 | 3/1989 |
| WO | 03064214 A1 | 8/2003 |
| WO | 2018148887 A1 | 8/2018 |

\* cited by examiner

VERTICAL BICYCLE RACK

CROSS-REFERENCES

This application claims the benefit under 35 U.S.C. § 119(e) of the priority of U.S. Provisional Patent Application Ser. No. 63/222,352, filed Jul. 15, 2021, the entirety of which is hereby incorporated by reference for all purposes. U.S. Pat. No. 10,850,678 B2 is also incorporated by reference herein, in its entirety, for all purposes.

BACKGROUND

Interest in outdoor recreational activities has increased demand for options to safely and securely carry cargo in or on a vehicle. A popular type of cargo rack is designed for attachment to a hitch receiver at the rear of a vehicle. One category of such hitch racks is designed to carry multiple bicycles.

There are numerous problems to be addressed by such racks. For example, bicycle racks need to be able to accommodate a diverse range of bicycle designs and geometries. Basic bicycle geometries have evolved into many variations for different riding purposes. Also, bicycle frame materials have been developed to be stronger and lighter, yet may be more vulnerable to damage from being clamped on a vehicle bicycle rack.

Hitch racks that carry bicycles with one wheel above the other, which may be referred to as a vertical orientation, offer a desirably compact arrangement. However, each bicycle must be secured to prevent unwanted motion or contact with adjacent bicycles. A rack that can stably and securely carry multiple bicycles in a vertical position is therefore desirable.

SUMMARY

The present disclosure provides systems, apparatus, and methods relating to vertical bicycle racks. In some examples, a vertical bicycle rack may include a horizontal beam and a plurality of support stations mounted to the horizontal beam, each station configured to support a bicycle in a vertical position and including a pair of cradles. Each cradle may be configured to receive a handlebar of the supported bicycle and may include a strap to secure the received handlebar in the cradle(s). A lower one of the pair of cradles may include a bumper to contact a frame component of the supported bicycle.

In some examples, a bicycle rack may include a hitch mount device and a mast structure having a proximal portion and a distal portion. The proximal portion of the mast structure may be connected to the hitch mount device and the distal portion may extend upward from the proximal portion. The bicycle rack may further include an upper beam structure connected horizontally to the distal portion of the mast structure, and a first handlebar holding station mounted on the upper beam structure. The first handlebar holding station may include an upper cradle and a lower cradle, at opposing ends of a central beam portion. Each cradle may be configured to support one of two handlebars of a bicycle. The lower cradle may include a rest portion configured to support a frame component of the bicycle.

In some examples, a bicycle rack may include a mast, a crossbeam mounted to the mast, and a plurality of handlebar support stations. Each handlebar support station may be selectively mountable at a plurality of locations along the crossbeam. Each handlebar support station may include a first cradle, a second cradle, a first strap securing device, and a second strap securing device. The first strap securing device may be mounted adjacent the first cradle, for securing a first handlebar portion in the first cradle. The second strap securing device may be mounted adjacent the second cradle, for securing a second handlebar portion in the second cradle.

Features, functions, and advantages may be achieved independently in various examples of the present disclosure, or may be combined in yet other examples, further details of which can be seen with reference to the following description and drawings.

DETAILED DESCRIPTION

Figure 1:
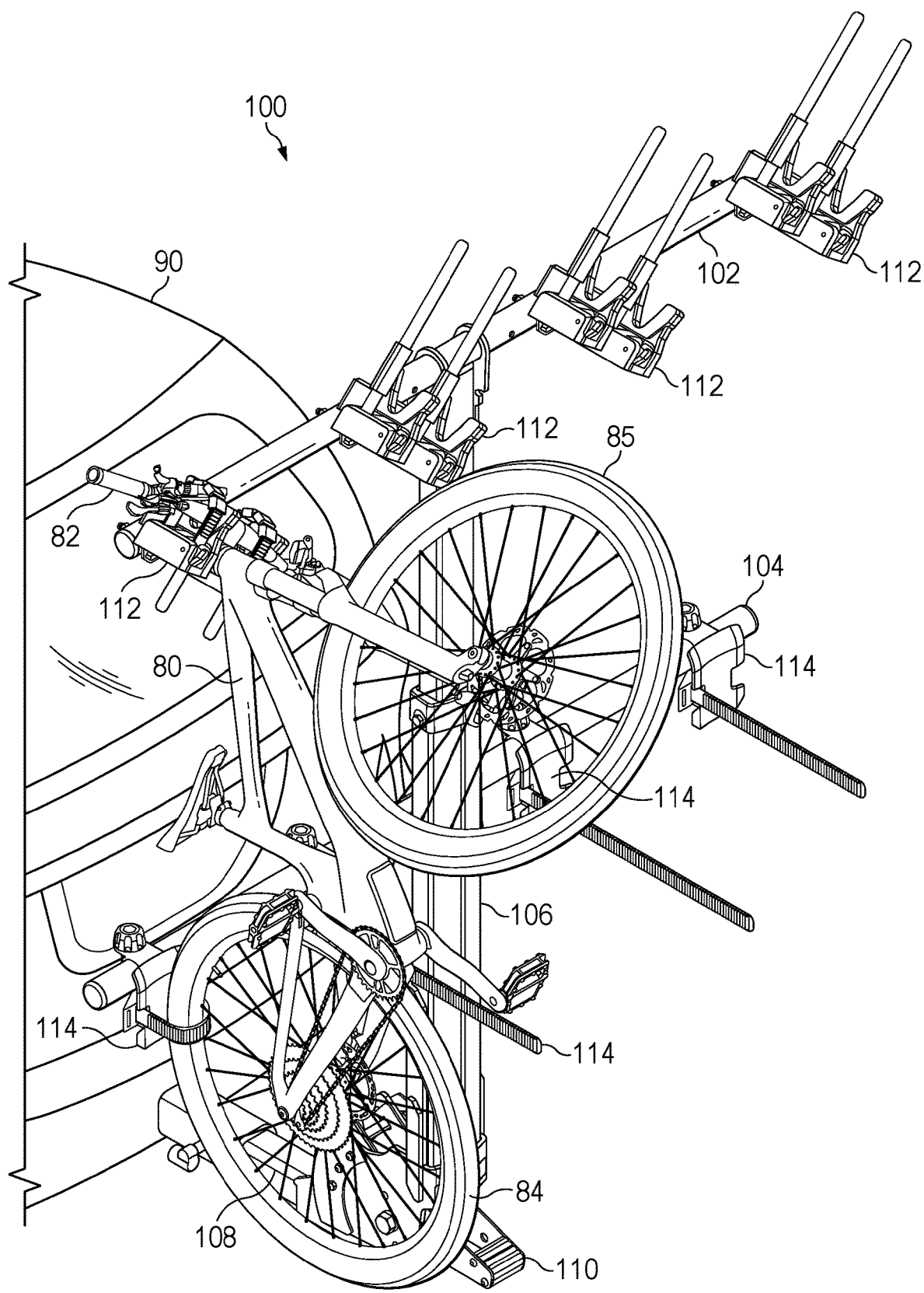
FIG. 1 is an isometric view of an illustrative handlebar-supporting vertical bicycle rack in accordance with aspects of the present disclosure, mounted to a vehicle and supporting one bicycle.

This disclosure provides numerous selected examples of a handlebar-supporting vertical bicycle rack. Many alternatives and modifications which may or may not be expressly mentioned, are enabled, implied, currently possessed, and are supported by the disclosure. Unless otherwise specified, a handlebar-supporting vertical bicycle rack in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion.

Definitions

The following definitions apply herein, unless otherwise indicated. Additionally, as used herein, like numerals refer to like parts.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Approximately" as used herein when referring to a measurable value such as a parameter, an amount, a temporal duration, and the like, is meant to encompass variations of +/−10% or less, preferably +/−5% or less, more preferably +1-1% or less, and still more preferably +/−0.1% or less of the specified value, insofar as such variations are appropriate to perform in the disclosure. It is to be understood that the value to which the modifier "approximately" refers is itself also specifically, and preferably, disclosed.

Overview

In general, a vertical bicycle rack may include a connector appropriate to mount the rack to a vehicle. For example, the rack may include a stinger, tongue, or bar configured to engage the hitch receiver of a vehicle hitch, and a locking mechanism or hitch-bolt to secure the engagement. The rack may include a primary elongate member, which may be securable at one or more angles. For example, the rack may include a mast pivotably attached to a hitch bar.

Upper and lower elongate members may be attached to the primary elongate member. For example, upper and lower crossbars or crossbeams may be fixed to a mast assembly. One or more support assemblies may be mounted on the upper elongate member, and one or more securing assemblies may be mounted on the lower elongate member. The support assemblies may be configured to support a bicycle by securing handlebars of the bicycle. The securing assemblies may be configured to stabilize and/or secure a bicycle by engaging a rear wheel of the bicycle. That is, the handlebars of the bicycle may be secured to the upper elongate member, and the rear wheel may be secured to the lower elongate member.

Each support assembly may include two hooks, cradles, angled supports, and/or channels to receive the two handlebars of the bicycle. The support assembly may be referred to as a handlebar holding station, upper support, and/or handlebar cradle. In some examples, the support assembly may comprise a bent metal bracket that is formed into two metal hooks, which are in turn covered by a plastic cap and TPE pad. The caps may be bolted in place for easy replacement. Each cap may hold a ratchet buckle and ratchet plastic strap similar to a rear wheel strap from a rear-of-car tray-style rack. The strap may be used to retain the handlebar while in place. The support assembly may include two straps, one on each side of the stem of the bicycle.

The handlebars of a bicycle received in a support assembly may be oriented as appropriate to allow bicycles to be nested closely together on the rack. Each bicycle may be placed on the rack with both wheels facing away from the vehicle. The frame of the bicycle may rest against a lower hook of the support assembly, and be biased in that position by gravity. The lower hook may include a bumper, rest, cap, and/or pad to support the stem or other adjacent frame component in an appropriate location between upper and lower hooks.

The vertical bicycle rack may be configured to hold a plurality of bicycles in a vertical position. Supporting the bicycles by the handlebars may allow the rack to accommodate mountain bikes, and additionally, bicycles that do not have front suspension, such as road bicycles, fully rigid bicycles, gravel bicycles and kids bicycles. In some examples, the support assemblies may be repositionable on the upper crossbar, for wider spacing to accommodate bicycles that cannot be fit as closely together, or for narrower spacing and greater carrying capacity. For example, road bicycles with drop bars may require additional clearance. The support assemblies may also be removable and/or interchangeable. For example, a wider support assembly may be available for securing bicycles with a dual crown fork, such as downhill bicycles.

Examples, Components, and Alternatives

The following sections describe selected aspects of exemplary handlebar-supporting vertical bicycle racks as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Bicycle Rack

As shown in FIGS. 1-8, this section describes an illustrative bicycle rack 100. Rack 100 is an example of a vertical bicycle rack, as described above. In FIG. 1, rack 100 is shown mounted to the hitch of a vehicle 90, and supporting a single bicycle 80.

Rack 100 includes an upper crossbeam 102 and a lower crossbeam 104, fixed to a mast assembly 106. In the depicted example, upper crossbeam 102 and lower crossbeam 104 are each a hollow cylinder with endcaps. Each crossbeam is connected horizontally to the mast assembly, fastened to the assembly by a bracket.

Bicycle 80 is suspended from rack 100 by a pair of handlebars 82, and further secured by a rear wheel 84. The term 'handlebar' as used herein may be understood to refer to one of two opposing side portions or handles of a steering member of a bicycle. Each handlebar of a bicycle may also be referred to as a handlebar portion. As described further below, a frame component of bicycle 80 also contacts rack 100 to position and stabilize the bicycle.

Mast assembly 106 is pivotably attached to a hitch bar 108 by a pivot mechanism 110. Any effective pivoting or connecting mechanism may be used to attach mast assembly 106 to hitch bar 108. In the present example, pivot mechanism 110 is a cam-based multi-position mechanism as described in U.S. Pat. No. 10,850,678, which is hereby incorporated by reference, in its entirety.

Mast assembly 106 may be extendable and/or otherwise reconfigurable. In the present example, mast assembly 106 is telescoping. That is, the mast assembly includes an upper portion slidably received in a lower portion. The upper portion is securable at each of a plurality of discrete positions relative to the lower portion, by a locking pin configured to extend through aligned apertures of the upper and lower portions. Each of the plurality of discrete positions corresponds to a length of mast assembly 106. In the present example, the mast assembly is securable at two lengths.

Figure 2:
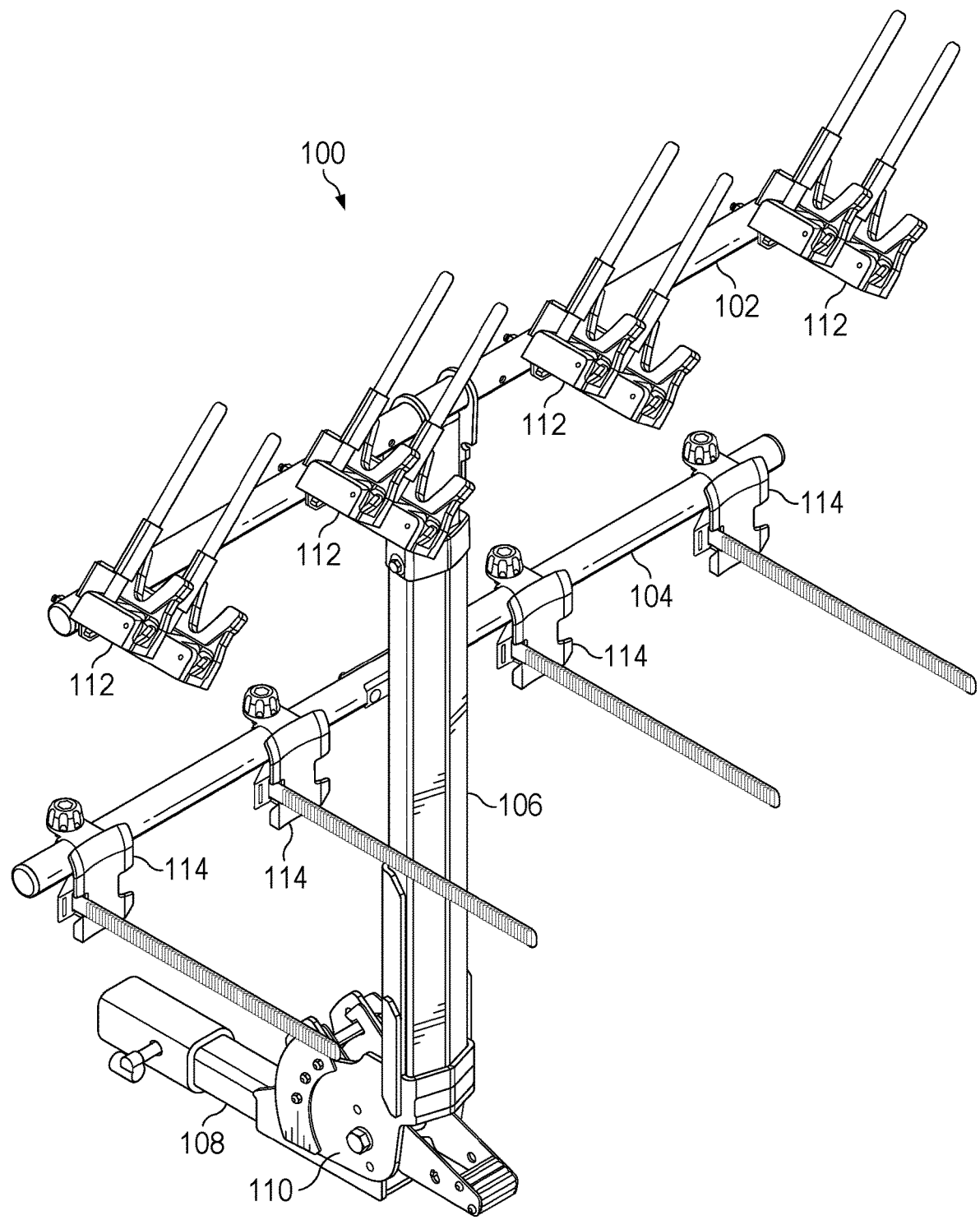
FIG. 2 is an isometric view of the bicycle rack of FIG. 1.

Mast assembly 106 and/or rack 100 may be described as having a transport position, a standby position, and an access position. Transitioning between positions may include telescoping the mast assembly and/or pivoting the mast assembly relative to hitch bar 108. In FIG. 1, the rack is depicted in the transport position. The upper portion of mast assembly 106 is extended to a maximum length of the assembly, and the mast assembly is approximately perpendicular to hitch bar 108. The mast assembly 106 may also be described as in a fully vertical orientation. The transport position may be used when bicycles are secured to rack 100. In FIG. 2, rack 100 is depicted in the standby position. The upper portion of mast assembly 106 is retracted to a minimum length of the assembly, and the mast assembly is approximately perpendicular to hitch bar 108. The standby position may be used when bicycles are not secured to rack 100, but the rack remains mounted to the vehicle.

Referring again to FIG. 1, the access position is not depicted, but mast assembly 106 may remain at either minimum or maximum length and may be pivoted down and away from the rear of vehicle 90 using pivot mechanism 110. The pivot mechanism may support the mast assembly at an oblique angle relative to hitch bar 108 and the vertical orientation. When no bicycles are secured to rack 100, the access position may be used to allow a user access to the rear of a vehicle, for instance to open a trunk or rear hatch, without removing the rack from the vehicle.

Rack 100 may also have a storage position. For example, pivot mechanism 110 may be configured to allow mast assembly 106 to collapse approximately parallel to hitch bar 108. The upper portion of mast assembly 106 may also be retracted to the minimum length of the assembly. The storage position may be used when rack 100 is removed from the vehicle for storage.

In FIG. 2, rack 100 is depicted separate from any vehicle and without any secured bicycles. A plurality of support assemblies or handlebar holding stations 112 are mounted to upper crossbeam 102. In the depicted example, the rack includes four identical stations. In some examples, the rack may include differently sized and/or configured stations and/or any appropriate number of stations. Preferably, the rack may include an even number of stations, to facilitate balanced loading of the rack.

As described further below, each station 112 is fastened to apertures in upper crossbeam 102. Holding stations 112 may be described as selectively mountable at a plurality of positions on upper crossbeam 102, as defined by the apertures of the crossbeam. Upper crossbeam 102 may include only apertures for four equally spaced mounting positions, or may further include apertures allowing mounting at intermediate positions. For instance, stations 112 may be detached from crossbeam 102, and repositioned on the crossbeam or omitted, as desired by a user to achieve appropriate clearance between supported bicycles.

A corresponding plurality of securing assemblies, wheel tacos, or wheel trays 114 are mounted to lower crossbeam 104. The wheel trays may also be referred to as wheel binding devices. Similar to holding stations 112, the rack may include any number, size and/or configuration of wheel trays and/or other wheel securing assemblies. The wheel trays may also be selectively mountable, detachable, and/or repositionable on lower crossbeam 104. In the present example, each wheel tray 114 is secured to lower crossbeam 104 by a screw clamp. Each wheel tray 114 is mounted to lower crossbeam 104 immediately below a corresponding one of handlebar holding stations 112.

In the present example, holding stations 112 are selectively mountable at a finite plurality of discrete positions on upper crossbeam 102. Such discrete positions may assist a user in effective spacing between holding stations. Positioning of wheel trays 114 may be guided by the positions of holding stations 112. In some examples, holding stations may be securable at any position along the upper crossbeam. For example, the holding stations may be secured to upper crossbeam 102 by a screw clamp similar to wheel trays 114.

Referring again to FIG. 1, similar to depicted bicycle 80, each bicycle secured on rack 100 is secured by a handlebar holding station 112 and a corresponding wheel tray 114. Handlebars 82 are received, supported, and secured by a holding station 112, as further described below. Rear wheel 84 is secured by a corresponding wheel tray 114. An outer surface of the rear wheel contacts the tray, and a strap wraps over a rim of the wheel to retain the wheel against the tray and prevent rotation.

Bicycle 80 is supported by rack 100 in a vertical position, with rear wheel 84 and a front wheel 85 facing away from vehicle 90. Vertical orientations and positions of the rack, the bicycle, and components thereof may be defined relative to mast assembly 106 of the rack. That is, descriptions herein related to a vertical axis including "upper" and "lower" may be understood as in a frame of reference wherein the mast assembly is parallel the vertical axis.

Rear wheel 84 is secured by wheel tray 114 in a vertical orientation. Front wheel 85 is secured at an angle relative to rear wheel 84, the primary frame of the bicycle, and mast assembly 106. That is, handlebars 82, a stem, a front fork, front wheel 85 and/or analogous elements of the bicycle are secured at an oblique angle relative to the vertical, by handlebar holding station 112.

Depicted bicycle 80 is a single fork crown road bicycle, for an adult. The depicted handlebar holding stations 112 may be described as a standard station, appropriate to secure such a bicycle. Rack 100 may be provided by default with four standard stations. The standard stations may be appropriate to secure a variety of bicycle types and a range of handlebar diameters. For instance, in addition to adult road bicycles the standard station may accommodate some children's bicycles, racing bicycles with drop bars, and single fork crown mountain bikes.

Rack 100 may additionally or alternatively be provided with and/or accessorized with other station configurations. For example, a user may purchase an extended rack provided with alternative stations and/or may separately purchase a station suited to a specific bicycle. Alternative stations may be configured for bicycles having any variation in handlebar and/or frame structure. For instance, alternative stations may be configured for small children's bicycles, bicycles with atypically narrow or slim handlebars, or dual-crown fork bicycles as described in Example C.

Figure 3:
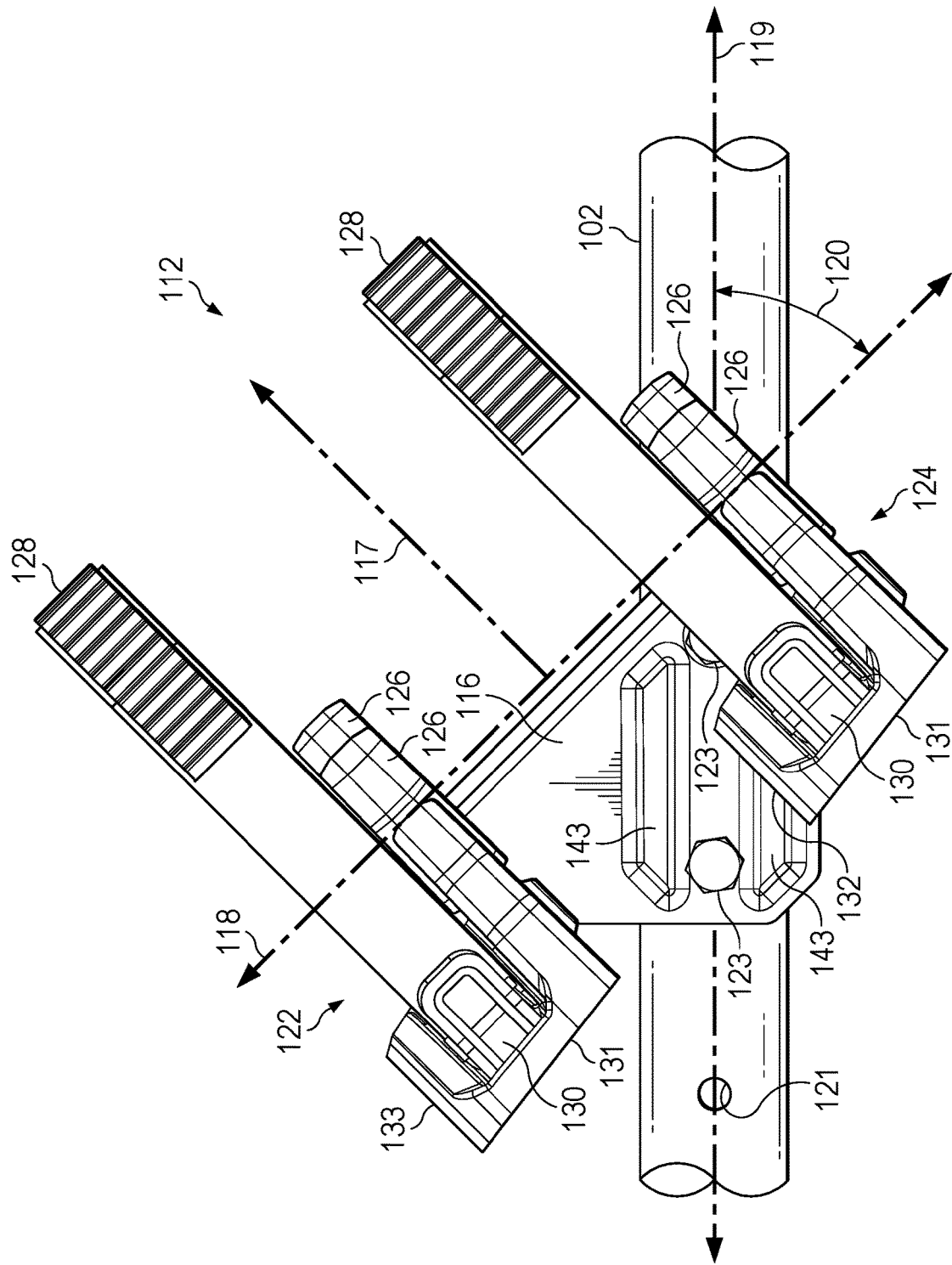
FIG. 3 is a front detail view of a handlebar holding station of the bicycle rack of FIG. 1, mounted to the upper crossbeam.

FIG. 3 shows one of handlebar holding stations 112, mounted on upper crossbeam 102. Each of the remaining stations may be understood to be substantially identical. Holding station 112 includes a central beam portion 116. As described further with reference to FIG. 3, central beam portion 116 is fastened to apertures 121 in upper crossbeam 102, by bolts 123. In the depicted example, upper crossbeam 102 includes additional apertures 121 to allow the user flexibility in the positioning of holding station 112 and therefore in the spacing between adjacent bicycles.

Central beam portion 116 defines a primary axis 118, which may also be described as a primary orientation of station 112. Upper crossbeam 102 defines an axis 119. Primary axis 118 is oriented at an oblique angle 120 relative to upper crossbeam axis 119. Holding station 112 may also be described as having a secondary axis 117, perpendicular to primary axis 118.

The orientation of primary axis 118 may in turn be the orientation of the handlebars and front wheel of a supported bicycle. Angle 120 may therefore also be the angle of supported handlebars relative to upper crossbeam 102. In the depicted example, angle 120 is approximately 45 degrees. Angle 120 may also be between approximately 30 and 60 degrees, or any appropriate angle. Such an angle may facilitate close nesting to an adjacent bicycle on the rack, while providing sufficient clearance of handlebars and front wheel from the adjacent bicycle.

At distal, opposing ends of central beam portion 116, the station includes an upper cradle 122 and a lower cradle 124. Upper cradle 122 is elevated relative to lower cradle 124 along a vertical axis of the rack, when the holding station is mounted to the upper crossbeam at angle 120. Each cradle may be described as having an upper and a lower side relative to the vertical axis of the rack, or as having an inner and an outer side relative to the holding station.

Each cradle includes a pair of fingers 126, a strap 128, and a buckle 130. Each of the pair of fingers 126 extends perpendicular to primary axis 118, defining a channel (see FIG. 5) extending between the fingers and parallel to the primary axis. Fingers 126 may also be referred to as a channel portion of the respective cradle.

Figure 7:
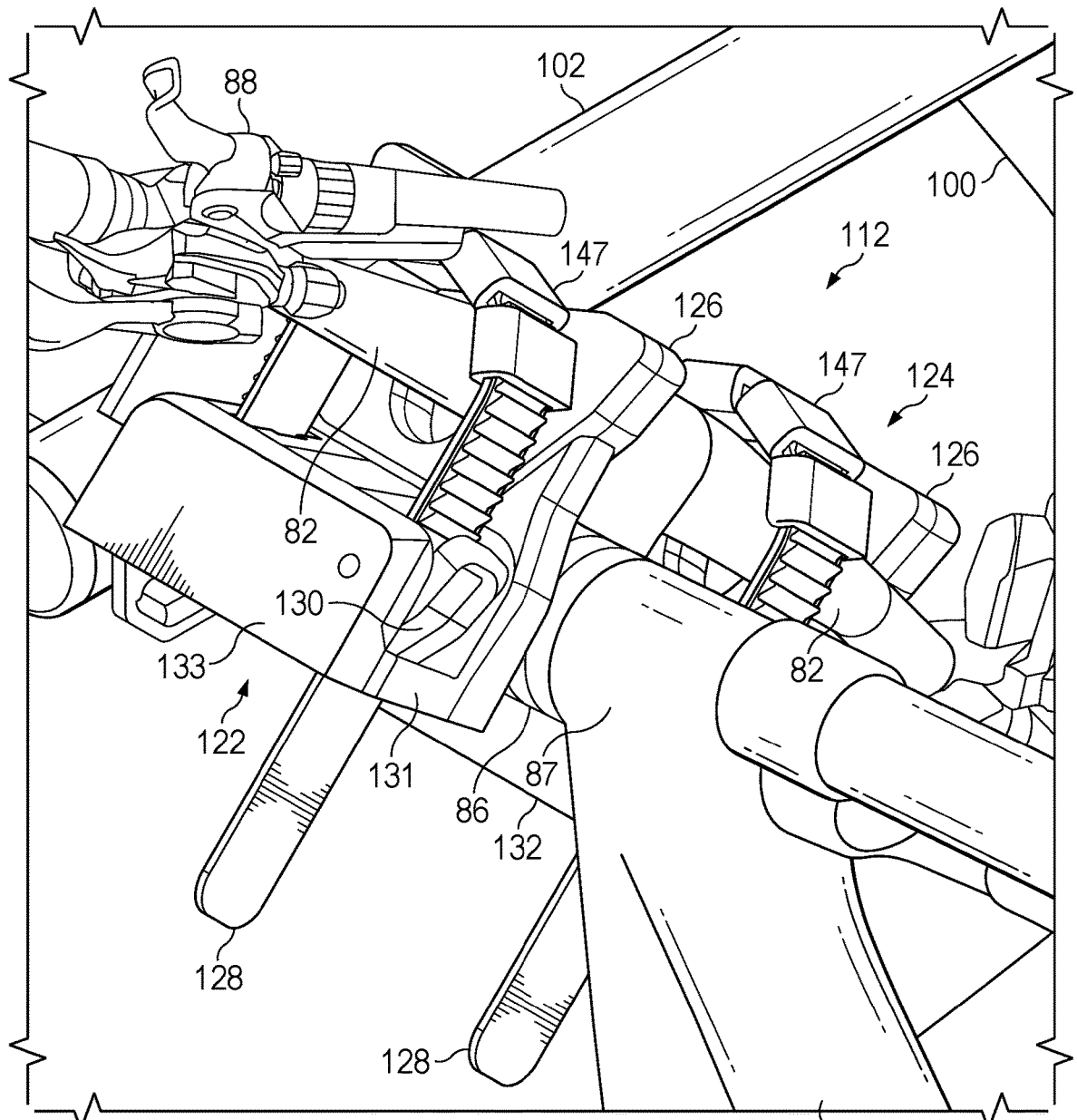
FIG. 7 is an isometric view of the handlebar holding station of FIG. 3, securing the handlebars of a bicycle.

Each cradle is configured to receive one of handlebars 82 of bicycle 80, as shown in FIG. 7. Each handlebar is received in the channel between the fingers of the respective cradle, as described further relative to FIG. 5 below. When received by the cradle the handlebar is oriented approximately parallel primary axis 118. The strap of the cradle loops over the received handlebar and is tightened down to secure the handlebar in the channel of the cradle.

Figure 5:
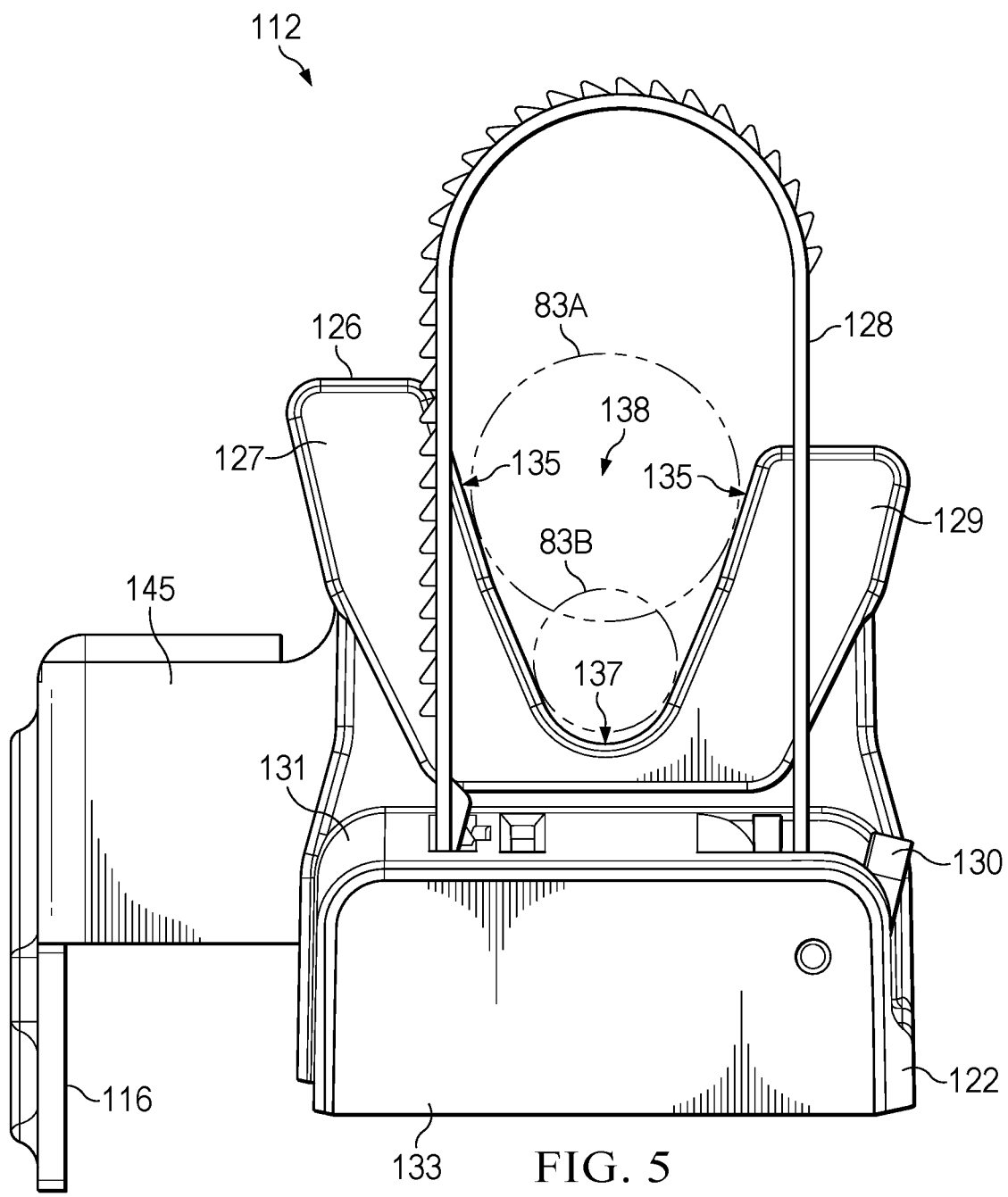
FIG. 5 is a side elevation view of the handlebar holding station of FIG. 3.

In the present example, straps 128 are ratchet straps, as shown more clearly in FIG. 5. Each strap 128 includes angled teeth, configured to mate with a ratcheting mechanism or catch of buckle 130. Buckle 130 further includes a release lever to disengage the ratcheting catch from strap 128. Strap 128 and buckle 130 may be described as a strap securing device. Each cradle 122, 124 includes a strap housing 131 in which one end of the corresponding strap 128 and the corresponding buckle are fixed. Strap housing 131 and strap 128 are on an upper side of fingers 126 in each cradle. The strap housing and strap are on an outer side of the fingers in upper cradle 122, and on an inner side of the fingers in lower cradle 124.

A user may insert the free end of a strap 128 into the corresponding buckle 130, and pull down on the end of the strap to secure a handlebar. To remove the handlebar, the user may release strap 128 by pulling the release lever of buckle 130. Strap 128 is flexible, but inelastic to improve stability of the secured bicycle, and prevent adverse effects from cyclical loading or vibrations.

Figure 4:
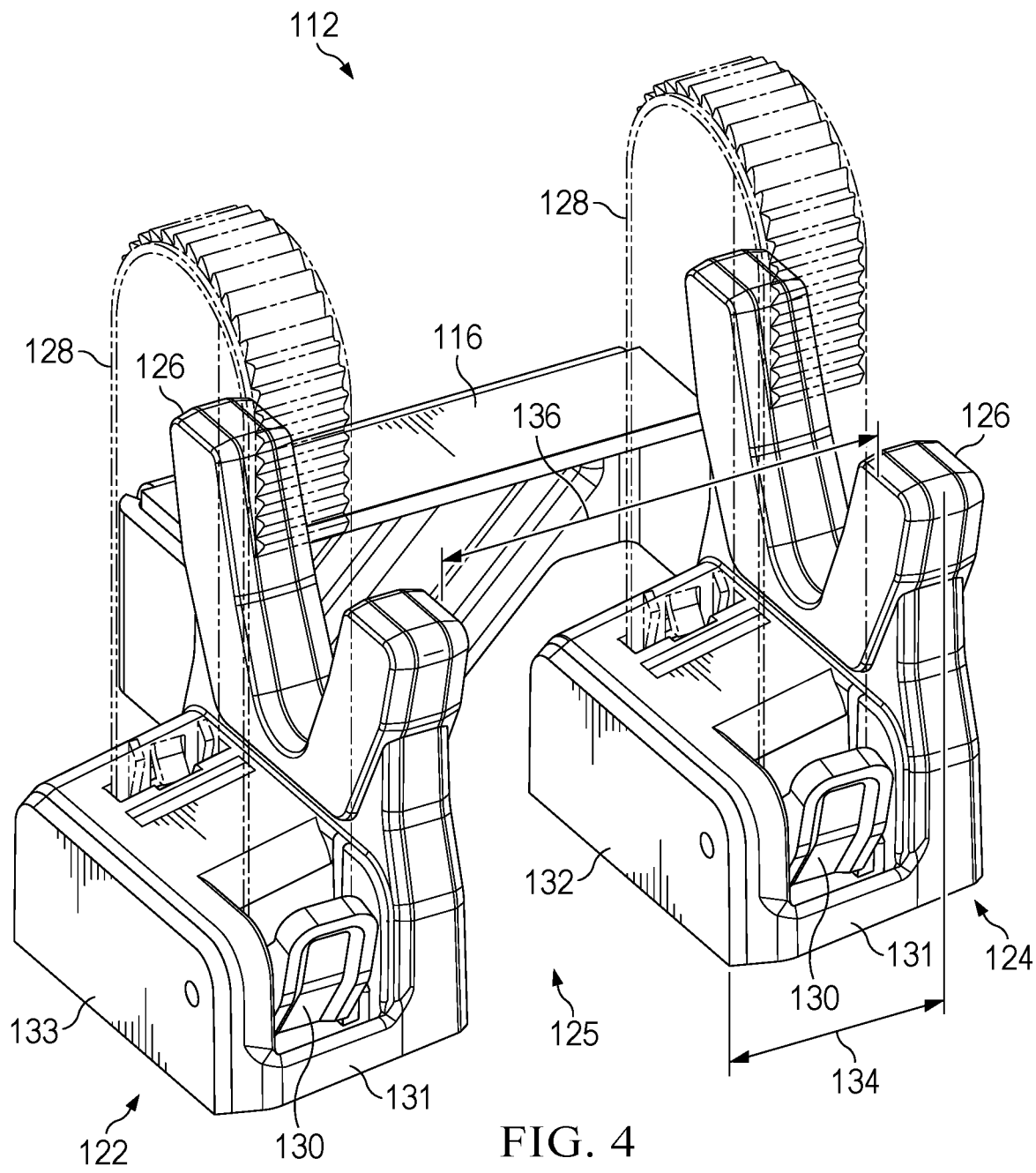
FIG. 4 is an isometric front view of the handlebar holding station of FIG. 3, with the ratchet straps depicted as transparent.

FIG. 4 is an isometric view of the handlebar holding station 112 of FIG. 3, unattached to the upper crossbeam and with straps 128 depicted as transparent. The holding station may be described as having an interior or intermediate space 125 between upper cradle 122 and lower cradle 124. When a bicycle is secured in holding station 112, a portion of the frame may be accommodated in intermediate space 125. For bicycle 80 depicted in FIGS. 1 and 7, a stem of the bicycle is received in intermediate space 125 between the cradles 122, 124.

Lower cradle 124 includes a bumper or rest portion 132 on an inner side of strap housing 131. Rest portion 132 is configured to support the stem of the bicycle, and to center the stem in station 112. The rest portion may also be described as disposed on an upper side of strap housing 131 of lower cradle 124. The rest portion may provide a safe point of contact between the stem and holding station 112, stabilize the frame of the bicycle relative to the handlebars, and support some of the weight of the bicycle. In some examples, such as the holding station described in Example C, rest portion 132 may be configured to additionally or alternatively support other elements of a bicycle frame, such as a fork crown or steerer tube.

Lower cradle 124 is spaced a distance 136 from upper cradle 122, as measured between the fingers 126 of each cradle, parallel the primary axis of the holding station. Distance 136 may also be referred to as a width of intermediate space 125 and/or an interior width of holding station 112. Interior width 136 may be selected according to necessary clearance for receipt of a bicycle. At least 7.5 to 10 centimeters (cm) or 3 to 4 inches (in) may be needed for small bicycles, while up to 20 to 23 cm (8 to 9 in) may be needed for larger or more complexly configured bicycles. In the present example, interior width 136 is approximately 11.5 cm (4.5 in).

Rest portion 132 is spaced a distance 134 from fingers 126 of lower cradle 124, as measured parallel the primary axis of the holding station. Rest distance 134 may be selected based on interior width 136, to center the bicycle stem. That is, distance 134 is selected such that when stem is in contact with rest portion 132, the stem is approximately centered between the upper and lower cradles. Centering the stem may help to ensure a corresponding point along each handlebar is received in the cradles.

Holding station 112 may be described in terms of a third distance, between rest portion 132 and fingers 126 of upper cradle 122. The third distance may be the difference between interior width 136 and rest distance 134. The third distance may differ between holding stations, according to a fork crown width, handlebar spacing, or other geometry of a bicycle to be secured by the holding station.

Rest portion 132 may also be described as a support surface, a frame rest, a stem spacer surface, and/or a stem offset. Positioning the bicycle stem at approximately an equal distance between points of contact between the two cradles and the handlebars of the bicycle, using the rest portion, may allow a better fit for a majority of bicycles. Also, mountain bike bars may taper and/or include bar-rise, so centering the stem in the holding station may produce a more predictable fit when placing different types of bicycles next to one another. Flagging may also be reduced, and a user may avoid contact between the holding station and bar tape as applied to drop bars. Centering the stem may also facilitate fitment of a wider range of kid's bicycles and city bicycles with narrow handlebars that have shifters and cables that can otherwise interfere with bicycle rack components.

Upper cradle 122 also includes a rest or bumper portion 133 on an outer side. Bumper portion 133 may protect from any potential contact with a bicycle secured at an adjacent station. The bumper portion may also be described as disposed on an upper side of strap housing 131 of upper cradle 122.

In the depicted example, upper cradle 122 and lower cradle 124 are matching, and rest portion 132 and bumper portion 133 are the same size and shape. Matching cradles may be simple and cost effective to manufacture. In some examples, the bumper of the upper cradle may be wider and shorter than rest portion 132, and not extend as far out as the rest portion. Such differences may facilitate desired positioning of bicycle handlebars, and compatibility with a wide range of bicycles.

FIG. 5 is an elevation view of the handlebar holding station 112 of FIG. 3, looking along the primary axis of the station to the upper side of upper cradle 122. Fingers 126 of upper cradle 122 are shown, but the following description may be understood to apply similarly to the fingers of lower cradle 124. A proximal finger 127 and a distal finger 129 of pair of fingers 126 define a channel 138. The channel may be described as having a rounded v-shape or as having flat or planar side surfaces meeting at a curved bottom surface. The channel may also be described as having an approximately flat extent, or a constant cross-sectional shape along the primary axis of the holding station.

Proximal finger 127 is longer than distal finger 129, which may facilitate loading of handlebars over distal finger 129 into channel 138. Each finger 127, 129 has an inner surface 135. Inner surfaces 135 may also be described as sides of channel 138. In the depicted example, each inner surface 135 comprises two planar sections, an upper section at a first angle and a lower section at a second, steeper angle. The angles may be described relative to the secondary axis of holding station 112, or relative to a receiving direction of channel 138. The angles of the inner surfaces 135 of the fingers 127, 129 are matching but mirrored. In the present example, the upper section of each inner surface has angle of approximately 18 degrees with the secondary axis, and the lower section has an angle of approximately 23 degrees.

In some examples, inner surfaces 135 may be fully planar and/or may have 3 or more planar sections. Inner surfaces 135 may have matching, mirrored angles or may differ in angle. Preferably, inner surfaces 135 and/or planar sections thereof may have angles relative to the secondary axis of holding station 112 between approximately 10 and 35 degrees. Inner surfaces 135 may also be described as at an oblique angle relative to one another. The inner surfaces may preferably have a relative angle between approximately 20 and 60 degrees.

Inner surfaces 135 meet at a curved bottom surface 137. The radius of curvature of the bottom surface may be relatively small compared to typical bicycle handlebar sizes, in order that most handlebars contact inner surfaces 135 of fingers 127, 129 when received in channel 138, instead of contacting bottom surface 137. In the present example, bottom surface 137 has a radius of curvature of approximately 9 millimeters (mm) or 0.35 inches (in). The bottom surface may have a radius of curvature of 5 to 10 mm less than a standard or common handlebar radius, such as 15 mm. The bottom surface may have a radius of curvature between 6.5 mm (0.25 in) and 25 mm (1 in).

Two illustrative handlebars are depicted in dashed lines, a first larger handlebar 83A and a second smaller handlebar 83B. First handlebar 83A may be described as seated higher in channel 138 than second handlebar 83B. Each size of handlebar contacts inner surface 135 of both fingers 127, 129, or both sides of channel 138. That is, each size of handlebar has two points of contact with channel 138 and holding station 112. The two points of contact may improve security and stability of the received handlebar, increasing frictional grip and resisting rocking or pivoting of the handlebar.

A wide range of handlebars may be similarly received by channel 138, with two points of contact, in contrast to a simply curved or j-hook style holder. Such a curved shape may receive only a single handlebar size or small range of sizes well, while smaller handlebars may sit on a single point at the bottom of the curve and larger handlebars cannot be accommodated by the curve.

Strap 128 is depicted untightened in FIG. 5. Once handlebar 83A or 83B is seated in channel 138, a user may tighten the strap until the strap contacts a distal or outer surface of the handlebar, opposite bottom surface 137. Strap 128 may wrap tightly over the outer surface of the handlebar, forcing the handlebar against inner surfaces 135.

Figure 6:
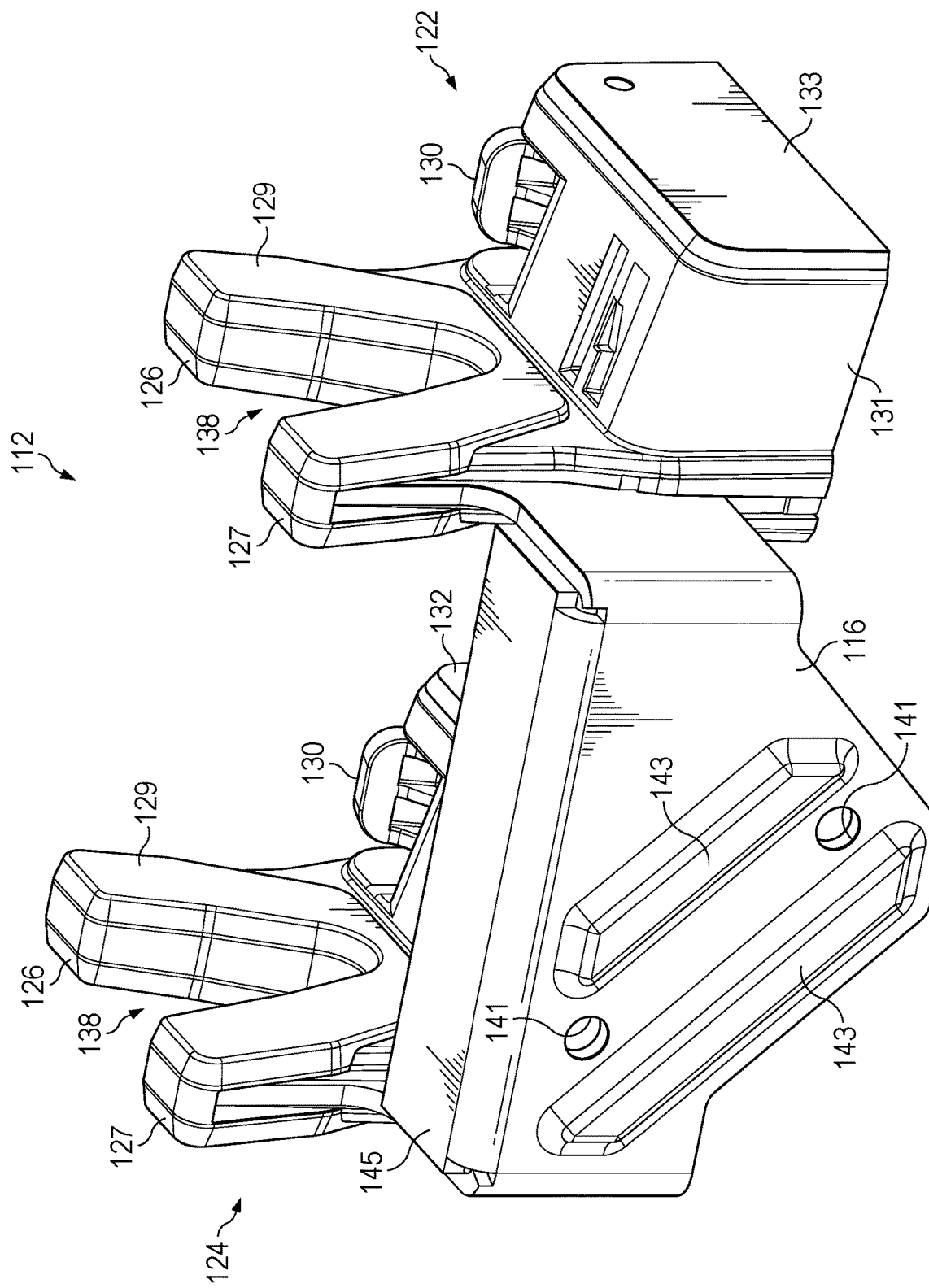
FIG. 6 is an isometric rear view of the handlebar holding station of FIG. 3.

FIG. 6 is an isometric view of a rear side of the handlebar holding station 112 of FIG. 3, unattached to the upper crossbeam and with straps 128 omitted. Central beam portion 116 has a planar back section configured for fastening to the upper crossbeam, which includes a pair of apertures 141. Apertures 141 may be aligned with a pair of correspondingly spaced apertures 121 in upper crossbeam 102 (FIG. 3), and a fastener assembly such as a nut, bolt, and washers may be secured through each of the aligned pair of apertures.

Fastening the central beam portion at two locations may facilitate correct alignment of the handlebar holding station relative to the upper crossbeam. That is, a user may consistently achieve the same angle between the primary axis of the holding station and the crossbeam axis when installing the holding station on the crossbeam, and the alignment may be maintained without rotation over time. Each holding station installed on the crossbeam may thereby be fixed at a matching angle, improving alignment of adjacent bicycles and reducing interference between handlebars.

In the present example, the upper crossbeam is cylindrical, and central beam portion 116 further includes spaced parallel linear protrusions 143 to facilitate alignment and increase contact between the flat back section of the central beam portion and the curved upper crossbeam. Linear protrusions 143 may aide a user in aligning and maintaining alignment of both apertures 141 with corresponding apertures in the crossbeam during installation of the fastener assemblies.

As discussed further with reference to FIG. 8 below, in the present example, central beam portion 116 is comprised of shaped sheet metal. Linear protrusions 143 are pressed or formed from the sheet metal of the back section. In some examples, linear protrusions may be separate elements fixed to the central beam portion, and/or may be otherwise shaped. For instance, the linear protrusions may include rubber pads glued to the central beam portion. Central beam portion 116 may additionally or alternatively include any attachment features appropriate to the features or geometry of the upper crossbeam.

Also shown in FIG. 6 is a spacing segment 145 of central beam portion 116. Spacing segment 145 includes a planar upper section and two planar side sections. The extent of spacing segment 145 may be selected to achieve an appropriate distance between the planar back section of central beam portion 116 and fingers 126 of cradles 122, 124.

When holding station 112 is installed on the upper crossbeam, spacing segment 145 may provide separation between the fingers of the cradles and the crossbeam. In turn, such separation may leave space between the handlebars of a secured bicycle and the crossbeam to accommodate bicycle structures or accessories. For instance, bicycle lights on the handlebars may be accommodated between the cradles and the crossbeam.

FIG. 7 is a detail view of one of handlebar holding stations 112 securing bicycle 80 on rack 100. A right-hand one of handlebars 82 is received in upper cradle 122, and a lefthand one of handlebars 82 is received in lower cradle 124. Cradles 122, 124 are oriented to align handlebars 82 with the primary axis of the central beam portion of station 112. That is, cradles 122 and 124 hold handlebars 82 at approximately a 45 degree angle relative to upper crossbeam 102. The bicycle is suspended by handlebars 82, from cradles 122 and 124.

Handlebars 82 are secured in place by straps 128. Each strap extends from an end fixed in strap housing 131, over the respective handlebar, and into the corresponding ratchet buckle 130. A free end of each strap is disposed below the corresponding strap housing 131.

In the depicted example, holding station 112 further includes an optional strap cover 147 on each strap. The cover may comprise a flexible material surrounding a section of strap 128. For example, the strap cover may be a slitted foam tube. Strap cover 147 may prevent direct contact between each strap 128 and the respective handlebar, avoiding any damage to malleable frame materials or fragile surface coatings.

Bicycle 80 includes a stem 86, a steering tube 87, and a front wheel fork. In the depicted example, both stem 86 and steering tube 87 contact rest portion 132 of lower cradle 124. The front wheel fork is clear of holding station 112. The stem 86 and the steering tube 87 are centered between upper cradle 122 and lower cradle 124. One cradle and corresponding strap are positioned on each side of stem 86 of the bicycle.

A position of fingers 126 of the cradles on handlebars 82 is determined by the position of stem 86, the fingers of the cradles being equidistant from a center point of the handlebars. A brake and shifter assembly 88 on each handlebar 82 is distal of the respective cradle, and therefore clear of interference with holding station 112. Each assembly 88 may also be described as on an outer side of the respective cradle 122, 124.

Stem 86 and steering tube 87 are also partially supported by rest portion 132. That is, the rest portion is below the stem and the steering tube, and in contact with the stem and the steering tube.

Figure 8:
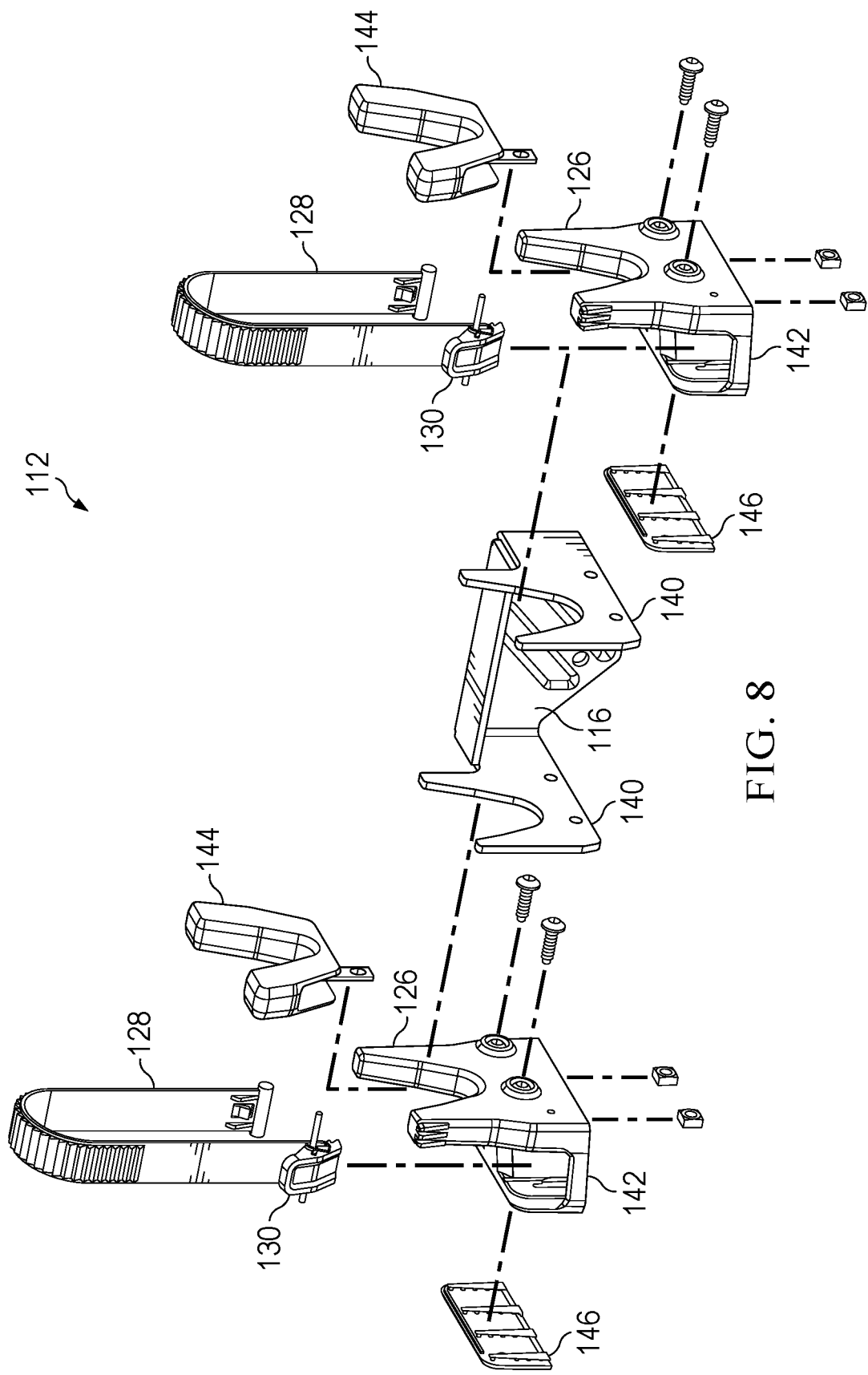
FIG. 8 is an exploded isometric view of the handlebar holding station of FIG. 3.

FIG. 8 is an exploded view of handlebar holding station 112, showing component parts of the station. The components are described with reference to the assembled structures as indicated in FIG. 4. Each cradle 122, 124 is comprised of a metal hook frame 140 extending out from central beam portion 116, covered by a cap structure 142. Central beam portion 116 and frames 140 may be part of a single formed sheet metal component, which may provide strength and stiffness to holding station 112.

Cap structure 142 may be a hollow plastic piece with reinforcing internal ribs for improved strength at minimal weight. The cap portion forms strap housing 131, and bumper portion 133 or rest portion 132. Buckle 130 and one end of strap 128 are mounted in cap 142.

Fingers 126 of cap structure 142 are in turn covered by a cover 144, which defines channel 138 and may protect received handlebars. In some examples, cover 144 may be optional and/or removable. A pad 146 covers each of bumper portion 133 of upper cradle 122 and rest portion 132 of lower cradle 122. Pads 146 and in some examples cover 144 may comprise a compressible material such as foam or rubber.

Components of holding station 112 may be fastened, bonded, and/or otherwise connected. In the present example, for each cradle 122, 124 a pair of fastener assemblies 152 extend through aligned apertures in cover 144, cap structure 142, and frame 140. Pad 146 is bonded to cap structure 142.

B. Illustrative Bicycle Rack

Figure 9:
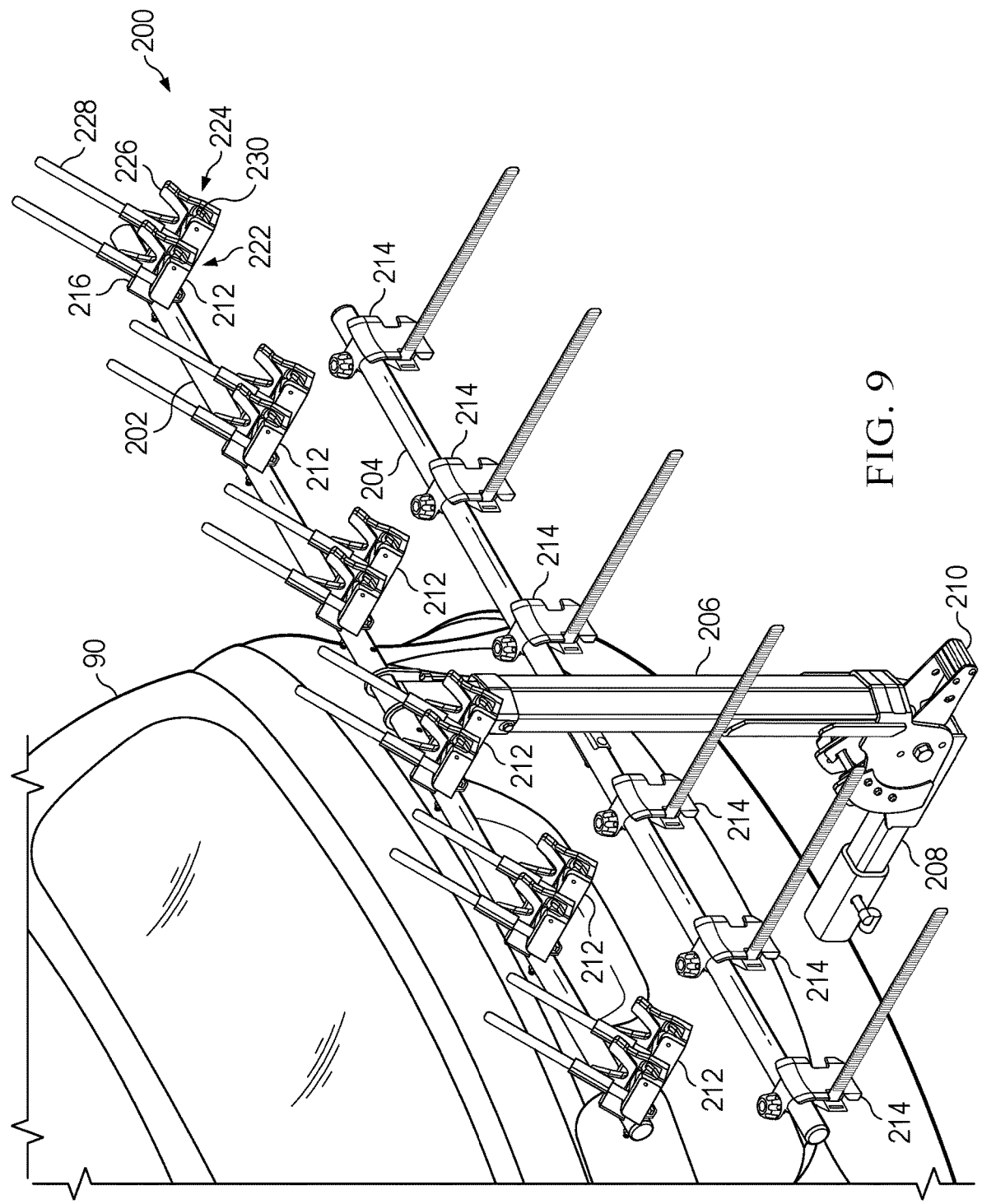
FIG. 9 is an isometric view of another illustrative handlebar-supporting vertical bicycle rack in accordance with aspects of the present disclosure, mounted to a vehicle.

As shown in FIG. 9, this section describes an illustrative bicycle rack 200. Rack 200 is another example of a vertical bicycle rack, as described above. The rack is shown mounted to the hitch of a vehicle 90.

Rack 200 is substantially similar to rack 100 as described above in Example A, including an upper crossbeam 202 and a lower crossbeam 204, fixed to a mast assembly 206. The mast assembly is pivotably attached to a hitch bar 208 by a pivot mechanism 210. A plurality of support assemblies or handlebar holding stations 212 are mounted to upper crossbeam 202, and a corresponding plurality of wheel trays 214 are mounted to lower crossbeam 204. Each wheel tray 214 is mounted to lower crossbeam 204 immediately below a corresponding one of handlebar holding stations 212.

In contrast to rack 100, rack 200 includes six handlebar holding stations 212 and six wheel trays 214. The crossbeams are of sufficient length to allow adequate spacing between six bicycles secured to rack 200. Rack 200 may be appropriate for use with larger vehicles having a greater hitch load capacity.

Each station 212 is fastened to apertures in upper crossbeam 202. Upper crossbeam 202 may include only apertures for six equally spaced mounting positions, or may further include apertures allowing mounting at intermediate positions. In the present example, handlebar holding stations 212 are the same standard holding station as handlebar holding stations 112 of rack 100, and are sized for a range of bicycles including an adult single fork crown road bicycle. Standard handlebar holding stations may be manufactured separately and installed on either rack 100 or rack 200.

As discussed further with reference to handlebar holding stations 112 above, each handlebar holding station 212 includes a central beam portion 216 defining a primary axis of the station. At distal, opposing ends of central beam portion 216, the station includes an upper cradle 222 and a lower cradle 224. Each cradle includes a pair of fingers 226, a strap 228, and a buckle 230. Holding station 212 is mounted on upper crossbeam 202 with the primary axis at an oblique angle relative to the crossbeam. In the depicted example, the angle is approximately 45 degrees.

Each bicycle secured on rack 200 is secured by a handlebar holding station 212 and a corresponding wheel tray 214. Handlebars of the bicycle are received, supported, and secured by a holding station 212. A rear wheel is secured by a corresponding wheel tray 214. The bicycle may be supported by rack 200 in a vertical position, with both wheels facing away from vehicle 90.

C. Illustrative Holding Station

Figure 10:
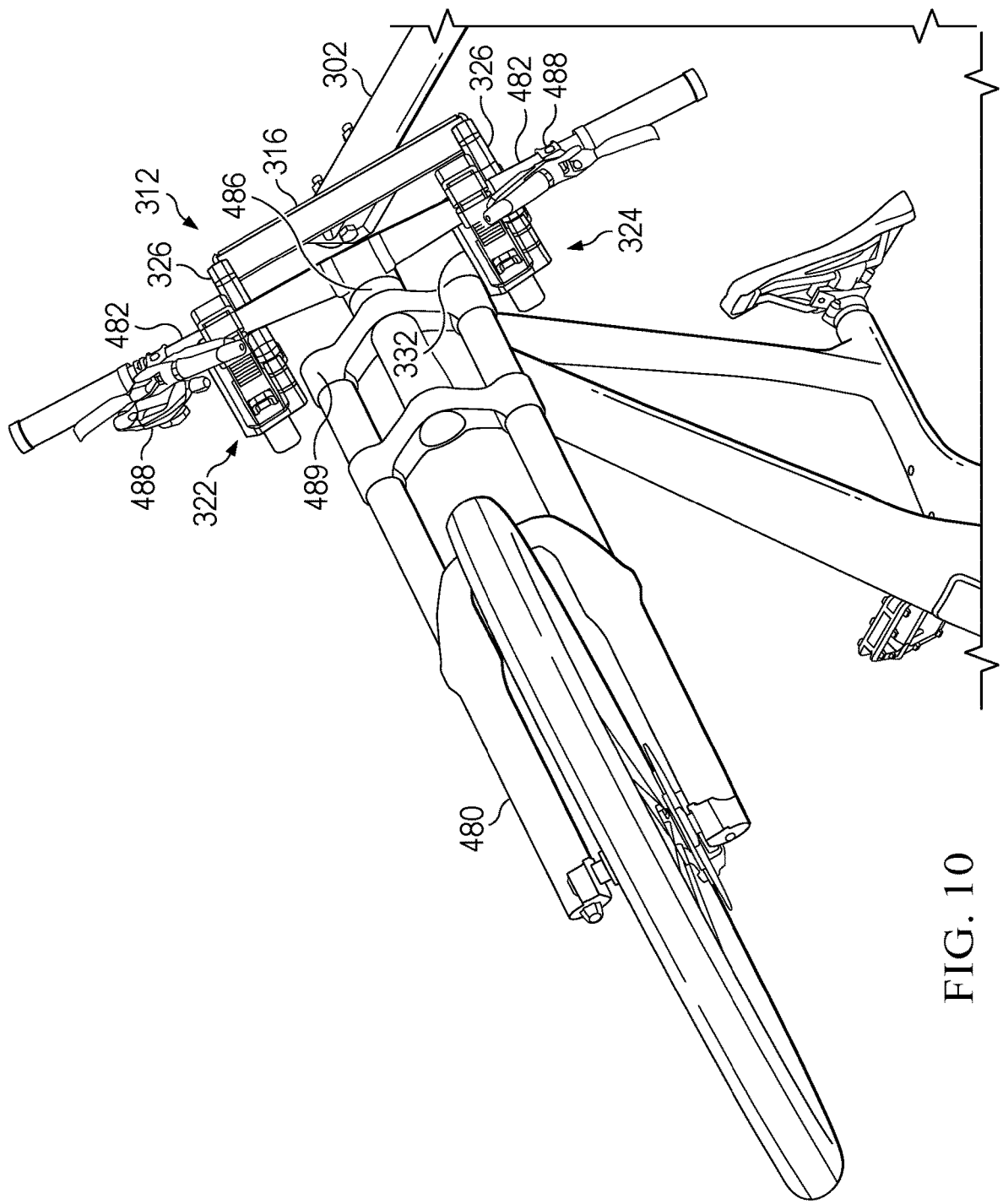
FIG. 10 is an isometric view of another illustrative handlebar holding station suitable for use with the bicycle racks of FIG. 1 or FIG. 9, supporting a mountain bike with a dual-crown suspension fork.

As shown in FIG. 10, this section describes an illustrative alternate handlebar holding station 312. Holding station 312 is an example of a support assembly, as described above. The holding station is shown mounted to an upper crossbeam 302 of a vertical bicycle rack, and supporting a bicycle 480.

Bicycle 480 depicted in FIG. 10 has a dual-crown suspension fork, which are common on downhill bicycles. The dual-crown fork may be too wide in the area immediately below the handlebars to be received between the cradles of a standard holding station 112 or 212 as described above in Examples A and B. Handlebar holding station 312 is substantially similar to standard holding stations 112, 212, including many equivalent structures which are correspondingly numbered. However, handlebar holding station 312 is sized and configured to accommodate the dual-crown fork of bicycle 480.

Handlebar holding station 312 includes a central beam portion 316 defining a primary axis of the station. At distal, opposing ends of central beam portion 316, the station includes an upper cradle 322 and a lower cradle 324. Each cradle includes a pair of fingers 326, a strap 328, and a buckle 330. Holding station 312 is mounted on upper crossbeam 302 with the primary axis at an oblique angle relative to the crossbeam. In the depicted example, the angle is approximately 45 degrees.

Holding station 312 may be described as having an intermediate space between upper cradle 322 and lower cradle 324. When a bicycle is secured in holding station 312, a portion of the frame may be accommodated in the intermediate space. For bicycle 480, a stem 486 and an upper fork crown 489 of the bicycle are received in the intermediate space between cradles 322, 324.

Lower cradle 324 includes a rest portion 332 on an inner side. Rest portion 332 is configured to support the upper fork crown of the bicycle, and to thereby center the stem in station 312. The rest portion may provide a safe point of contact between the dual-crown fork and holding station 312, stabilize the frame of the bicycle relative to the handlebars, and support some of the weight of the bicycle.

Lower cradle 324 is spaced a first distance from upper cradle 322, as measured between the fingers 326 of each cradle, parallel the primary axis of the holding station. The first distance may also be referred to as a width of the intermediate space and/or an interior width of holding station 312. The first distance may be selected according to necessary clearance for receipt of a bicycle.

Rest portion 332 is spaced a second distance from fingers 326 of lower cradle 324, as measured parallel the primary axis of the holding station. The second distance may be selected based on the first distance and a standard or common fork width, in order to center the bicycle stem. That is, the position of rest portion 332 is selected such that when upper fork crown 489 is in contact with the rest portion, stem 486 is approximately centered between the upper and lower cradles. Centering the stem may help to ensure a corresponding point along each handlebar is received in the cradles, and avoid interference by brake and shifter assemblies 488 of bicycle 480.

In the present example, holding station 312 has a first distance of approximately 19.5 cm (7.75 in) between upper cradle 322 and lower cradle 324, in order to accept large downhill shock widths. As compared to standard holding stations 112, 212, holding station 312 has a shorter distal finger (see distal finger 129 in FIG. 5) on lower cradle 324, and a larger pad on rest portion 332 to protect the fork crown of the bicycle. Rest portion 332 may also extend out farther, away from central beam portion 316, than upper cradle 322. Such a larger rest portion may provide support for a wider array of downhill shock and/or handlebar configurations.

Holding station 312 may be configured for use with rack 100 and/or rack 200 as described above in Examples A and B, in place of one or more standard holding stations 112, 212. Holding station 312 may include connection features appropriate for fastening to existing apertures in upper crossbeam 102 or 202. For example, central beam portion 316 of holding station 312 may include a pair of apertures having a spacing that matches apertures of the crossbeam and/or may include a pair of elongate protrusions configured to engage the crossbeam.

In some examples, a user may desire to secure a bicycle to a vertical bicycle rack such as rack 100 or rack 200 where the bicycle frame is not accommodated by a standard handlebar holding station. Such a user may remove the standard station from the upper crossbeam of the rack, and install handlebar holding station 312 as a replacement. Handlebar holding station 312 may then be used in conjunction with standard stations to transport multiple types of bicycle simultaneously.

In another example, a rack may include a plurality of handlebar holding stations 312. For instance, such a rack may be appropriate for transportation of a plurality of downhill mountain bikes.

Illustrative Combinations and Additional Examples

This section describes additional aspects and features of handlebar-supporting vertical bicycle racks, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A bicycle rack, comprising:
a hitch mount device,
a mast structure having a proximal portion connected to the hitch mount device, and a distal portion extending upward from the proximal portion,
an upper beam structure connected horizontally to the distal portion of the mast structure, and
a first handlebar holding station mounted on the upper beam structure, including:
an upper cradle and a lower cradle, at opposing ends of a central beam portion, each cradle configured to support one of two handlebars of a bicycle,
wherein the lower cradle includes a flat rest portion configured to support a stem of the bicycle.

A1. The bicycle rack of A0, wherein the central beam portion has a primary beam axis and is fastened to the upper beam structure with the primary beam axis at an oblique angle relative to the upper beam structure.

A2. The bicycle rack of A1, wherein each of the upper cradle and the lower cradle is oriented to support a received handlebar approximately parallel the primary beam axis of the central beam portion.

A3. The bicycle rack of A2, wherein the angle of the primary beam axis relative to the upper beam structure is between approximately 30 and 60 degrees.

A4. The bicycle rack of A3, wherein the angle is 45 degrees.

A5. The bicycle rack of any of A0-A4, wherein each of the upper cradle and the lower cradle includes a channel portion to receive a handlebar.

A6. The bicycle rack of A5, wherein each channel has a width generally parallel a received handlebar, the channel portion having an approximately constant cross-sectional shape for the full width.

A7. The bicycle rack of A5 or A6, wherein the channel portion includes planar first and second inner side surfaces, the first and second inner side surfaces being at an oblique relative angle and joined by a curved lower surface of the channel portion.

A8. The bicycle rack of A7, wherein the curved lower surface is cylindrical.

A9. The bicycle rack of A7 or A8, wherein the relative angle of the first and second inner side surfaces is between approximately 35 degrees and 55 degrees.

A10. The bicycle rack of any of A7-A9, wherein the curved lower surface has a radius of curvature between approximately one quarter and one inch.

A11. The bicycle rack of any of A0-A10, wherein the central beam portion is fastened to the upper beam structure.

A12. The bicycle rack of any of A0-A11, wherein the central beam portion includes two apertures and two approximately linear protrusions configured to engage a cylindrical upper beam structure and align the two apertures of the central beam portion with two corresponding apertures of the upper beam structure.

A13. The bicycle rack of any of A0-A12, wherein:
the upper and lower cradles are at opposing ends of the central beam portion along a primary beam axis,
each of the upper cradle and the lower cradle includes a channel portion configured to receive a handlebar,
the rest portion of the lower cradle is spaced from the channel portion of the lower cradle along the primary beam axis.

A14. The bicycle rack of A13, wherein the rest portion is approximately perpendicular to the primary beam axis.

A15. The bicycle rack of A13 or A14, wherein the rest portion is configured to center a supported bicycle stem between the channel portions of the upper and lower cradles.

A16. The bicycle rack of any of A0-A15, wherein the rest portion is on an inner side of the lower cradle.

A17. The bicycle rack of A16, wherein the rest portion includes a pad.

A18. The bicycle rack of any of A0-A17, wherein each of the upper and lower cradles includes a strap to secure a supported handlebar.

A19. The bicycle rack of A18, wherein each strap is flexible and inelastic.

A20. The bicycle rack of A18 or A19, wherein each strap includes ratchet teeth and each of the upper and lower cradles further includes a corresponding ratcheting buckle.

A21. The bicycle rack of A20, wherein each strap is fixed to the respective cradle at one end.

A22. The bicycle rack of A21, wherein each strap loops over a received handlebar.

A23. The bicycle rack of any of A18-A22, wherein the strap of the upper cradle is an on an outer side of the upper cradle, and the strap of the lower cradle is on an inner side of the lower cradle.

A24. The bicycle rack of any of A18-A23, wherein the strap of the lower cradle is disposed between the rest portion and a channel portion configured to receive a handlebar.

A25. The bicycle rack of any of A0-A24, wherein the central beam portion of the first handlebar holding station is fastenable at a plurality of positions on the upper beam structure.

A26. The bicycle rack of A25, further including a plurality of handlebar holding stations, each station being fastenable at the plurality of positions on the upper beam structure.

A27. The bicycle rack of any of A0-A26, wherein the first handlebar holding station has a first distance between the upper cradle and the rest portion of the lower cradle, and further comprising a second handlebar holding station, including:
an upper cradle and a lower cradle, at opposing ends of a central beam portion, each cradle configured to support one of two handlebars of a bicycle,
wherein the lower cradle includes a flat rest portion configured to support a fork crown of a bicycle, and a second distance between the upper cradle and the rest portion of the lower cradle is greater than the first distance.

A28. The bicycle rack of any of A0-A27, further comprising:
a lower beam structure connected horizontally to the proximal portion of the mast structure, and
a first wheel binding device mounted on the lower beam structure, configured to secure a rear wheel of a bicycle while handlebars of the bicycle are supported by the first handlebar holding station.

A29. The bicycle rack of any of A0-A28, wherein the first handlebar holding station is configured to support a first bicycle, and further comprising:
a second handlebar holding station mounted on the upper beam structure and configured to support a second bicycle adjacent to the first bicycle.

B0. A method of transporting a bicycle on a vehicle, comprising:
connecting a rack to a hitch receiver of the vehicle,
lifting handlebars of the bicycle into upper and lower cradles of a handlebar holding station mounted to an upper beam structure of the rack,
resting a stem of the bicycle against a flat portion of the lower cradle,
securing each handlebar of the bicycle with a ratchet strap of a respective cradle,
securing a rear wheel of the bicycle with a wheel binding device mounted on a lower beam structure of the rack.

C0. A bicycle rack, comprising:
a hitch mount device,
a mast structure having a proximal portion connected to the hitch mount device, and a distal portion extending upward from the proximal portion,
an upper beam structure connected horizontally to the distal portion of the mast structure, and
a first handlebar cradle mounted on the upper beam structure, including:
a first angled support and a second angled support connected by a central brace portion, each of the first and second angled supports including a v-shaped channel configured to receive a handlebar and a strap configured to secure the handlebar,
wherein the first angled support is lower than the second angled support and includes a rest portion on a side facing the second angled support, the rest portion being configured to support a bicycle frame component.

D0. A vertical bicycle rack, comprising
a horizontal support beam,
a plurality of cradles mounted to the support beam, each cradle configured to support a bicycle in a vertical position, and including a pair of hooks,
wherein each hook is configured to receive a handlebar of the supported bicycle and includes a strap to secure the received handlebar, and lower one of the pair of hooks includes a bumper to contact a stem of the support bicycle.

E0. A bicycle rack, comprising:
a handle bar gripping station including a first cradle and a second cradle, and a first strap securing device mounted adjacent the first cradle and a second strap securing device mounted adjacent the second cradle, for gripping handle bars of a bicycle.

E1. The bicycle rack of E0, wherein each cradle has an upside and a downside, each strap securing device being located on the upside of a respective cradle.

E2. The bicycle rack of E0 or E1, wherein the upside of the second cradle has a stem spacer surface for supporting and positioning a bicycle stem between the cradles.

E3. The bicycle rack of any of E0-E2, wherein each strap securing device includes a ratcheting catch and a release lever.

F0. A bicycle rack, comprising:
a mounting bracket,
first and second cradles attached to the mounting bracket, wherein the mounting bracket is configured to be fastened to a horizontal beam such that the first cradle is elevated relative to the second cradle.

G0. A bicycle rack, comprising:
a mast,
a cross-beam mounted to the mast, and
a plurality of handle-bar support stations, each station being selectively mountable at a plurality of locations along the cross-beam.

H0. A bicycle rack, comprising:
a beam supporting an upper cradle and a lower cradle, at least one of the cradles having a strap device for securing a handle bar portion in the respective cradle.

J0. A bicycle rack, comprising:
a horizontal crossbeam, and
a plurality of handlebar holding stations fastened to the crossbeam, each handlebar holding station including an upper cradle and a lower cradle on opposing ends of a central beam portion,
wherein each cradle includes an inner frame portion, the inner frame portions and the central beam portion comprising a single monolithic component.

J1. The bicycle rack of J0, wherein the central beam portion includes a pair of spaced parallel linear protrusions extending at an oblique angle to a primary axis of the handlebar holding station.

K0. A bicycle rack, comprising:
a hitch mount device,
a mast structure having a proximal portion connected to the hitch mount device, and a distal portion extending upward from the proximal portion,
an upper beam structure and a lower beam structure connected horizontally to the distal portion of the mast structure,
a plurality of handlebar holding stations fastened to the upper beam structure and each including a pair of cradles configured to receive bicycle handlebars, and
a plurality of wheel restraints fastened to the lower beam structure and each including a tray configured to contact a bicycle rear wheel,
wherein the pair of cradles of each handlebar holding station and the tray of each wheel restraint are on an opposite side of the mast structure from the hitch mount device.

L0. A bicycle secured to a bicycle rack mounted to a vehicle, comprising:
a mast mounted to a hitch receiver behind the vehicle,
a crossbeam mounted to the mast, and
a handle-bar support station fastened to the crossbeam and supporting a pair of handlebars of the bicycle,
wherein a front wheel and a rear wheel of the bicycle are on an opposite side of the crossbeam from the vehicle.

Advantages, Features, and Benefits

The different examples of the bicycle racks described herein provide several advantages over known solutions for transportation of bicycles in a vertical orientation. For example, illustrative examples described herein allow a variety of bicycle types with varying geometry to be securely mounted to the rack together.

Additionally, and among other benefits, illustrative examples described herein improve bicycle stability which in turn reduces risk of bicycle ejection, limits bicycle to bicycle contact, and avoids damage at bicycle to rack contact points.

Additionally, and among other benefits, the v-shaped cradle geometry of illustrative examples described herein holds many diameters of handlebars in a stable manner, where previous racks are only suitable to hold handlebars of around 30 mm (1.2 in).

Additionally, and among other benefits, the inelastic straps of illustrative examples described herein provide additional bicycle stability compared to an elastic strap.

The illustrative examples described herein are particularly useful for transportation of multiple bicycles on a vehicle with a hitch. However, not all examples described herein provide the same advantages or the same degree of advantage.

CONCLUSION

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A vertical bicycle rack, comprising
   a horizontal beam,
   a plurality of support stations mounted to the horizontal beam, each station configured to support a bicycle in a vertical position, and including a pair of cradles,
   wherein each cradle is configured to receive a handlebar of the supported bicycle and includes a strap to secure the received handlebar, and a lower one of the pair of cradles includes a bumper to contact a frame component of the supported bicycle.

2. A bicycle rack, comprising:
   a hitch mount device,
   a mast structure having a proximal portion connected to the hitch mount device, and a distal portion extending upward from the proximal portion,
   an upper beam structure connected horizontally to the distal portion of the mast structure, and
   a first handlebar holding station mounted on the upper beam structure, including:
      an upper cradle and a lower cradle, at opposing ends of a central beam portion, each cradle configured to support one handlebar of a pair of handlebars of a bicycle,
      wherein the lower cradle includes a rest portion configured to support a frame component of the bicycle.

3. The bicycle rack of claim 2, wherein the central beam portion has a primary beam axis and is fastened to the upper beam structure with the primary beam axis at an oblique angle relative to the upper beam structure.

4. The bicycle rack of claim 3, wherein the angle of the primary beam axis relative to the upper beam structure is between approximately 30 and 60 degrees.

5. The bicycle rack of claim 3, wherein each of the upper and lower cradles is oriented to support a received handlebar approximately parallel the primary beam axis of the central beam portion.

6. The bicycle rack of claim 2, wherein each of the upper cradle and the lower cradle includes a channel portion to receive a handlebar.

7. The bicycle rack of claim 6, wherein each channel portion includes planar first and second inner side surfaces, the first and second inner side surfaces being at an oblique relative angle and joined by a curved lower surface of the channel portion.

8. The bicycle rack of claim 2, wherein:
   the upper and lower cradles are at opposing ends of the central beam portion along a primary beam axis,
   each of the upper cradle and the lower cradle includes a channel portion configured to receive a handlebar,
   the rest portion of the lower cradle is spaced from the channel portion of the lower cradle along the primary beam axis.

9. The bicycle rack of claim 8, wherein the supported frame component is a stem of the bicycle and the rest portion is positioned to center the stem between the channel portions of the upper and lower cradles.

10. The bicycle rack of claim 2, wherein each of the upper and lower cradles includes a strap to secure a supported handlebar.

11. The bicycle rack of claim 10, wherein the strap of the upper cradle is on an outer side of the upper cradle, and the strap of the lower cradle is on an inner side of the lower cradle.

12. The bicycle rack of claim 2, wherein the central beam portion of the first handlebar holding station is fastenable at a plurality of positions on the upper beam structure.

13. The bicycle rack of claim 12, further including a plurality of handlebar holding stations, each station being fastenable at the plurality of positions on the upper beam structure.

14. The bicycle rack of claim 2, wherein the first handlebar holding station has a first distance between the upper cradle and the rest portion of the lower cradle, and further comprising a second handlebar holding station, including:
   an upper cradle and a lower cradle, at opposing ends of a central beam portion, each cradle configured to support one of two handlebars of a bicycle,
   wherein the lower cradle includes a flat rest portion configured to support a fork crown of a bicycle, and a second distance between the upper cradle and the rest portion of the lower cradle is greater than the first distance.

15. The bicycle rack of claim 2, further comprising:
   a lower beam structure connected horizontally to the proximal portion of the mast structure, and
   a first wheel binding device mounted on the lower beam structure, configured to secure a rear wheel of a bicycle while handlebars of the bicycle are supported by the first handlebar holding station.

16. A bicycle rack, comprising:
   a mast,
   a crossbeam mounted to the mast, and
   a plurality of handlebar support stations, each station being selectively mountable at a plurality of locations along the crossbeam, wherein each station includes:
      a first cradle
      a second cradle,
      a first strap securing device mounted adjacent the first cradle, for securing a first handlebar portion in the first cradle, and
      a second strap securing device mounted adjacent the second cradle, for securing a second handlebar portion in the second cradle,
      wherein an upper side of the second cradle has a stem spacer surface for supporting and positioning a bicycle stem between the cradles.

17. The bicycle rack of claim 16, wherein each cradle has an upper side and a lower side, each strap securing device being located on the upper side of the adjacent cradle.

18. The bicycle rack of claim 16, wherein the first cradle is elevated relative to the second cradle.

19. The bicycle rack of claim 16, wherein each strap securing device includes a ratcheting catch and a release lever.

* * * * *